Patented Aug. 4, 1931

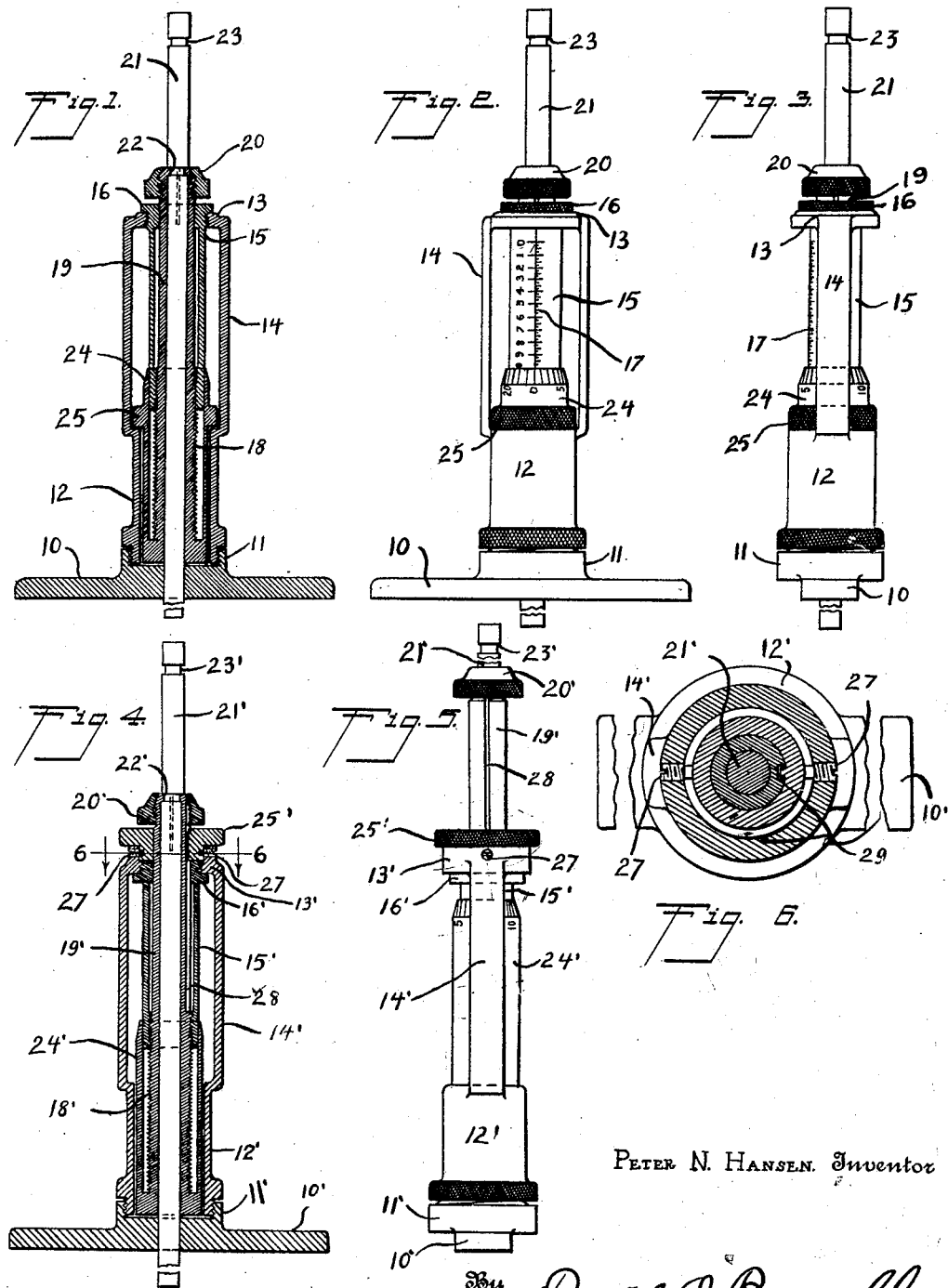

1,817,622

UNITED STATES PATENT OFFICE

PETER N. HANSEN, OF EMERSON, NEBRASKA

MICROMETER DEPTH GAUGE

Application filed April 23, 1928. Serial No. 272,218.

My invention relates to micrometer depth gauges, or gauges of the class wherein the base or frame of the instrument is engaged with the surface from which measurement is to be made, and the distance to be measured from said base surface is indicated by the extension therefrom of a spindle under control of a micrometer screw. In ordinary micrometer calipers for outside and inside measurements, the instrument is read by reference to a scale graduated on a sleeve carried by the frame of the instrument, said sleeve being progressively uncovered by the thimble as the measure is increased, so that the exposed portion of the scale represents the distance or reading desired. In micrometer depth gauges as usually constructed, the relation of the graduated sleeve and the thimble is the reverse of that employed in calipers, in that the sleeve is progressively covered by the thimble as the measure is increased, and consequently the desired reading is indicated by the covered portion instead of the uncovered or exposed portion of the scale on the sleeve. This reversed relation of the sleeve and thimble tends to confuse the workman, and to cause errors in reading the indications of such depth gauges. It is the object of my invention to provide a micrometer depth gauge wherein the indication or reading of the desired measurement is effected in the same manner as in micrometer calipers, or in which the exposed portion of the scale graduated on the sleeve indicates the measurement to be read, whereby confusion or error in reading the indications of the instrument may be avoided.

In the accompanying drawings Fig. 1 is a longitudinal section of an instrument embodying my invention, the parts being shown in the position for maximum extension of the spindle from the base surface, Fig. 2 is a side elevation of the same, Fig. 3 is an end elevation of the same, Fig. 4 is a longitudinal section of a slightly modified form of the instrument, Fig. 5 is an end elevation of the same, showing the spindle fully retracted relative to the base surface, and Fig. 6 is a transverse section on the line 6—6 of Fig. 4.

Referring first to the structure shown in Figs. 1, 2 and 3, I provide a base 10 having at the central portion thereof the internally threaded boss 11 into which is screwed the lower end of an upright frame comprising a tubular lower portion 12, an annular head portion 13, and an intermediate open portion formed by a pair of diametrically opposite bars 14 integral with the portions 12 and 13. Into the threaded opening through the head 13 is screwed the sleeve 15 which has at its upper end a flange 16 engaging the upper side of the head 13. The body of the sleeve extends down through the open portion of the frame between the bars 14, and upon one side of the sleeve is marked the usual scale 17, with numbered graduation marks for each tenth of an inch, and intermediate un-numbered marks for each twenty-five thousandths of an inch. The lower portion of the sleeve is provided with an internal thread forming the micrometer-nut which is engaged by the screw 18, the latter being tubular and having an un-threaded stem-portion 19 extending slidably through the upper end of the sleeve.

The upper end of the tubular screw-stem 19 is conically beveled, and adjacent to said beveled end the stem is threaded to receive the clamp-nut 20. The threaded and beveled end of the stem is slitted or kerfed longitudinally, whereby to form a collet for clamping the spindle 21, which extends slidably through the stem and the screw 18, and projects through an opening in the base 10, as shown. The collet-end of the stem 19 has small inwardly extending lugs 22 adapted to enter grooves 23 in the spindle, whereby to assure the clamping of the latter in exact relations to the screw. The thimble 24 is fixedly united or integral with the lower portion of the screw 18, and extends upwardly about the screw to inclose the same and the lower portion of the sleeve 15, over which it fits slidably. The upper end of the thimble is conically beveled and is graduated in the usual manner for indicating partial or fractional rotation of the same, corresponding to thousandths of an inch advance of the screw. The knurled setting-collar 25 is formed integrally with the thimble, and moves in the open portion of the frame between the bars 14, the sides of the collar being thus exposed for engagement between the thumb and finger of the user, for rotating the thimble and screw as required in the operation of the instrument.

At the positions of the parts shown in Figs. 1, 2 and 3, the spindle is at the maximum extension from the base-surface, and the scale 17 on the sleeve is fully uncovered or exposed. By suitable rotation of the thimble, screw and spindle, the latter is retracted or withdrawn into the base, and the sleeve is progressively covered by the thimble, until at the limit of the retracting movement the end of the spindle is flush with the base surface and the end of the thimble is in register with the zero (0) mark of the scale 17 on the sleeve, said scale being then entirely covered by the thimble. It will thus be seen that at all times the amount of extension of the spindle from the base surface will be the same as the length of the exposed or uncovered portion of the scale 17 on the sleeve, and the reading of the instrument will correspond with the reading of ordinary micrometer calipers, whereby the user familiar with the latter will not be confused and caused to err in the reading of the depth gauge.

In the modified structure represented in Figs. 4, 5 and 6, the setting-collar is omitted from the thimble 24', and a collar 25' is mounted revolubly in the head 13' of the frame, said collar being retained in the head by means of small screws 27 extending through the sides of the head and having inner end-portions entering a groove in the collar, as shown in Fig. 6. The screw-stem 19' passes slidably through the bore of the collar 25', and said stem 19' has a longitudinal groove or keyway 28 into which is extended a lug 29 formed in the bore of the collar as shown in Fig. 6. The screw-stem 19', screw 18', thimble 24', and spindle 21' may thus be rotated by turning the collar 25' within the head 13'. The upper end of the stem 19' is provided with a clamp-nut 20' and inwardly extended lugs 22', said portion of the stem being kerfed or slitted to form a collet, as in the first described form of the instrument. The sleeve 15' is screwed into the head 13' from the lower side thereof, the flange 16' engaging the lower side of the head, and otherwise said sleeve 15' is the same as the sleeve 15. It will be seen that in the modified structure the open portion of the frame, formed by the bars 14', may be made narrower than the frame of the first instrument, due to the omission of the setting-collar from the thimble. The operation of the modified instrument is the same as the first, except that by rotation of the setting-collar 25' its longitudinal relation to the frame is not changed, while the setting-collar 25, being integral with the thimble, moves longitudinally when rotated.

Now, having described my invention, what I claim and desire to secure by Letters Patent is:

1. In a micrometer depth gauge, a frame having an annular head, a tubular base portion and bars connecting the head with the base portion; a sleeve secured to the annular head and extending into the space intermediate the head and base, said sleeve having an internal thread, a screw engaged with said thread and extending through the sleeve, a thimble fixedly connected with said screw and extending about said sleeve, and a spindle carried by the screw and extending through the base portion of the frame.

2. A micrometer depth gauge, comprising a frame having a head, a base and an open intermediate portion; an internally threaded sleeve secured to the head of the frame and extending into the open intermediate portion thereof and having a graduated scale, a tubular screw engaging the internal thread of said sleeve, said screw having a stem portion extending through the upper end of the sleeve and provided with a collet, a spindle secured to said stem by said collet and extending through the stem and the screw and adapted to project from the base of the frame, and a thimble fixedly associated with said screw and having a graduated end portion arranged for coaction with the scale graduated on said sleeve, the thimble and sleeve being associated to expose portions of said scale corresponding to the projection of the spindle from the base.

3. In a micrometer depth gauge, the combination with a sleeve having a longitudinal scale graduated thereon, a screw having threaded connection with said sleeve, a thimble fixedly associated with said screw and movable about the sleeve during rotation of the screw therein, and a spindle connected with said screw; of a frame having a head to which said sleeve is secured and having a tubular base portion toward which said sleeve extends from the head, the portion of the frame intermediate said head and base having openings to expose the scale on the sleeve, the spindle carried by the screw being adapted for extension through the base portion of the frame, and the thimble being so related to the sleeve as to uncover and expose a portion of the scale thereon corresponding with the distance to which the spindle is extended from the base surface.

PETER N. HANSEN.